United States Patent [19]

Schwer

[11] Patent Number: 4,490,173

[45] Date of Patent: Dec. 25, 1984

[54] STEELMAKING ADDITIVE COMPOSITION

[76] Inventor: John W. Schwer, 1349 Azalea Dr., Munster, Ind. 46321

[21] Appl. No.: 555,716

[22] Filed: Nov. 28, 1983

Related U.S. Application Data

[63] Continuation-in-part of Ser. No. 431,540, Sep. 30, 1982.

[51] Int. Cl.$^3$ ................................................ C21C 7/02
[52] U.S. Cl. ........................................... 75/58; 75/53; 75/257
[58] Field of Search ............................ 75/53, 58, 257

[56] References Cited

U.S. PATENT DOCUMENTS 4,364,771 12/1982 Cordier ..................................... 75/58
4,374,664 2/1983 Mitsuo ..................................... 75/58

*Primary Examiner*—Peter D. Rosenberg
*Attorney, Agent, or Firm*—Jones, Day, Reavis & Pogue

[57] ABSTRACT

Steelmaking additive compositions and process of use, said compositions providing flux solubilization, desulfurization and/or removal of inclusions. The compositions comprise from about 25 to 50 wt % lime and about 75 to 50 wt % of a compound selected from the group consisting of bauxite and mixtures of calcium aluminate and bauxite; alternatively, the compositions comprise from about 40 to 70 wt % CaO, 20 to 50 wt % $Al_2O_3$ from bauxite or mixtures of calcium aluminate and bauxite and 0 to 30 wt % MgO. The process consists of the addition, in the course of steelmaking utilizing electric furnace, basic oxygen furnace, AOD furnace or open hearth furnace means, of the steelmaking additive compositions of the invention to either the furnace, ladle and/or tundish.

14 Claims, No Drawings

STEELMAKING ADDITIVE COMPOSITION

RELATED APPLICATION

This application is a continuation-in-part of application Ser. No. 431,540, filed Sept. 30, 1982.

BACKGROUND OF THE INVENTION

1. Field of the Invention

The invention relates to steelmaking, particularly to additive compositions for use during the steelmaking process.

2. Description of the Prior Art

The basic steelmaking process comprises a well-known series of general steps in the transformation of cast or pig iron into steel. Various furnaces for use in steelmaking are available, including the electric arc furnace, the basic oxygen furnace (top blown, bottom blown, top and bottom blown), the AOD furnace, and the open hearth furnace. While choice of the specific furnace to be used and specific procedure to be followed varies based on criteria known to those skilled in the steelmaking art, depending upon the composition, purity and end-use of the steel desired, certain difficulties in steel production exist across these broad procedures.

Primary among the problems faced in steelmaking is the removal of sulfur and inclusions, such as undesirable oxides, silicates and aluminates, from the steel during production. Removal of sulfur is of particular importance and difficulty, as too high a sulfur content deleteriously affects the performance of the resulting steel. Flexibility as to the manner and timing of effecting desulfurization and inclusion removal is also important, yet not readily controllable. Ideally, the steelmaker wishes to be afforded the option to perform desulfurization through treatment of the initial charge in the furnace, before tapping; or through treatment of the steel in the ladle; or through treatment in the tundish.

Of similar importance is the ability to effect the solubilizing in the steel charge of lime and/or other flux materials. Ease in solubilizing fluxing materials in the furnace affects the efficiency, control and speed of the initial melting and heat operations, and impacts on the overall composition, quality and purity of the steel product.

Many solubilizing, desulfurization and inclusion-removing steelmaking additives are known to the art, principal among them being the use of spar, $CaF_2$. While spar affords the flexibility as to the manner and timing of effecting desulfurization and inclusion removal, its use presents serious drawbacks.

When used to effect desulfurization in the furnace, spar attacks the furnace's refractory lining, particularly eroding the refractory at the slag line. This drastically reduces the number of heats which the lining can withstand before a costly and time-consuming relining of the vessel is necessary. When used to effect desulfurization in the ladle, spar again attacks the refractory lining, necessitating frequent, costly relines and unacceptable downtime for the ladle. Alloy recovery during injection or stirring is also reduced as a result of spar use. A further problem is the excessive heat loss that results from the use of spar in the ladle, as it has poor insulating properties, requiring that the heat be tapped at a high temperature and thereby resulting in a shortening of furnace and ladle refractory lining life. An additional shortcoming is the ineffectiveness of spar to remove inclusions in the ladle, especially during stirring.

When used in the tundish, spar usage results in even greater difficulties. It fails to provide any cover material, resulting in excessive heat loss and a poor temperature profile due to its inferior insulation properties. Use of spar in the tundish also fails to provide effective desulfurization, nor does it remove and retain inclusions. Refractory attack is again a serious problem. Finally, varying degrees of undesired reoxidation and recarburization (if carbon is present) can occur.

It is apparent that there existed in the steelmaking art a serious need for an additive capable of solubilizing fluxing materials, desulfurizing the steelmaking charge, and removing inclusions, such as undesired oxides, aluminates, silicates and sulfides, without presenting the serious shortcomings resulting from use of the known additives, yet providing the steelmaker with the flexibility to effect solubilization of fluxes, desulfurization and/or inclusion removal either in the furnace, ladle or tundish.

SUMMARY OF THE INVENTION

The aforenoted shortcomings of the known materials are alleviated by use of the compositions and method of the present invention, which provide an additive composition effective for the solubilizing of fluxing materials, desulfurization, and removal of undesired inclusions from the steelmaking charge during steelmaking operations through introduction in the furnace, ladle and/or tundish.

The novel compositions of the invention comprise from about 25 to 50 wt% lime and 75 to 50 wt% of a compound selected from the group consisting of bauxite and mixtures of calcium aluminate and bauxite. Dolomitic lime (approximately 58 wt% CaO, 42 wt% MgO) may be utilized, as may standard lime (95 wt% CaO); either lime may be utilized in calcined or hydrated form, calcined being preferred. The calcium aluminate may be either mono, di or tri calcium aluminate, with dicalcium aluminate ($CaAl_2O_4$ or $Ca(AlO_2)_2$) being preferred. The bauxite may be either straight or fused bauxite, or mixtures thereof, with fused (or calcined) bauxite being preferred.

Raw material for the novel compositions of the invention include standard compounds of acceptable quality and purity to the steelmaking industry, as well as waste by-product material resulting from the production of calcium metal, e.g. slag material from the melting process. Other possible sources include slags of the lime-alumina variety generated in the production of stainless or alloy steel or other metals.

The process of the invention comprises the addition of the novel additive compositions of the invention during the steelmaking process to effect flux solubilization, desulfurization and/or the removal of inclusions. The compositions of the invention may be added to the furnace with the initial charge, or at any time during the heat prior to tapping. Alternately, or in addition to the furnace, the compositions of the invention may be added to the ladle or in the tundish.

The amount of the composition of the invention utilized is that necessary to effect the desired degree of flux solubilization, desulfurization and/or removal of inclusions. When used in the furnace, the amount of the compositions of the invention utilized will be 25 to 50% of the heretofore known amount of spar utilized by those skilled in the art. When used in the ladle, the amount of the compositions of the invention utilized will be from about 5 to about 20 pounds per ton of steel, the specific amount used depending on the degree of desulfurization required, the surface area of the steel liquid in the ladle, and the thickness of the blanket (or cover) of the composition desired to serve an additional insulating function to avoid heat loss and maintain a desired temperature profile in the molten steel. When used in the tundish, the amount of the compositions of the invention utilized will be from about 1 to about 10 pounds per ton of steel, the specific amount used depending on the degree of desulfurization and/or inclusion removal desired, the necessity to minimize reoxidation of the steel, the surface area of the steel liquid in the tundish, and the thickness of the blanket (or cover) of the composition desired to serve an additional insulating function to avoid heat loss and maintain a desired temperature profile in the molten steel.

The compositions of the invention afford the desired flexibility of use to the steelmaker without the concomitant shortcomings of the known prior art additives, particularly spar. When used in the furnace, the compositions of the invention effectively put lime and/or other fluxing materials into solution rapidly and efficiently, provide desulfurization of the charge, and cleanse the charge of the known deleterious inclusions, including undesirable aluminates, silicates and oxides. When used in the ladle, the compositions of the invention provide desulfurization of the charge, cleanse the charge of the known deleterious inclusions, and provide an insulating blanket (or cover) to minimize heat loss and maintain a desired temperature profile. Finally, when used in the tundish, the compositions of the invention prevent or minimize reoxidation of the steel, provide desulfurization of the charge, cleanse the charge of the known deleterious inclusions, and provide an insulating blanket (or cover) to minimize heat loss and maintain a desired temperature profile.

Accordingly, it is an object of this invention to provide novel steelmaking compositions and process which provide flexibility of addition during the steelmaking cycle of the composition to effect solubilization of flux materials, desulfurization and/or removal of undesired inclusions.

It is a further object of this invention to provide novel steelmaking compositions and process for adding said compositions to the steelmaking furnace wherein use of said compositions avoids attack on the furnace refractory lining, markedly improves the lining life while avoiding erosion at the slag line and reaction with the refractory, rapidly solubilizes lime and/or other fluxes into the steelmaking charge, and effects desulfurization and/or removal of inclusions.

It is another object of this invention to provide novel steelmaking compositions and process for adding said compositions to ladles used in the course of steelmaking operations wherein use of said compositions avoids attack on the ladle refractory lining, markedly improves the lining life while avoiding erosion at the slag line and reaction with the refractory, improves alloy recovery and efficiency, especially during desulfurization, provides for control and minimization of heat loss and temperature profile by providing an insulating blanket (or cover), which affords tapping of the heat at a lower temperature (which in turn improves furnace and ladle refractory lifetimes), and effects desulfurization and/or removal of inclusions during taping and stirring.

It is yet another object of this invention to provide novel steelmaking compositions and process for adding said compositions to the tundish used in the course of steelmaking operations wherein use of said compositions markedly reduces or eliminates reoxidation or recarburization of molten steel, avoids attack on the tundish refractory lining, markedly improving the lining life, provides for control and minimization of heat loss, and control of temperature profile, by providing an insulating blanket (or cover), effects or enhances desulfurization, and provides excellent removal of inclusions and cleansing of the molten steel.

Other objects and advantages of this invention will become apparent upon reading the following detailed description and appended claims.

DESCRIPTION OF THE PREFERRED EMBODIMENT

The preferred proportion of the compounds comprised within the compositions of the invention is about 33 to 67wt% lime and 67 to 33 wt% of a compound selected from the group consisting of bauxite and mixtures of calcium aluminate and bauxite. A particularly preferred composition of the invention consists essentially of about 50 wt% lime and 50 wt% of a compound selected from the group consisting of bauxite and mixtures of calcium aluminate and bauxite. An optimal composition of the invention consists essentially of about 25 wt% lime and 75 wt% of a compound selected from the group consisting of of calcium aluminate and bauxite and mixtures thereof.

The preferred compositions of the invention may also utilize dolomitic lime, which is made up of approximately 58 wt% CaO and 42 wt% MgO. The preferred compositions of the invention may utilize mono, di or tri calcium aluminate; dicalcium aluminate ($CaAl_2O_4$ or $Ca(AlO_2)_2$), however, is particularly preferred for use in these compositions. Bauxite is also particularly preferred for use in these compositions. The mixtures of calcium aluminate and bauxite may be used at any proportion, one to the other, through from 50 to 90 wt% calcium aluminate and 10 to 50 wt% bauxite is preferred.

The optimal compositions of the invention utilize only bauxite as an alumina source or consist of about 50wt% lime, about 35wt% calcium aluminate and about 15wt% calcined bauxite.

Specific preferred compositions of the invention are the following, the $Al_2O_3$ content being provided by bauxite or mixtures of calcium aluminate and bauxite:

| | |
|---|---|
| CaO | 50 to 70 wt % |
| $Al_2O_3$ | 20 to 50 wt % |
| MgO | OPTIONAL |
| $SiO_2$ | <3 wt %, |
| particularly | |
| CaO | 65% |
| $Al_2O_3$ | 33% |
| $SiO_2$ | <3% |
| MgO | OPTIONAL; |
| CaO | 55–65 wt % |
| $Al_2O_3$ | 30–40 wt % |
| MgO | OPTIONAL |
| $SiO_2$ | <3 wt %, |
| particularly | |
| CaO | 60 wt % |
| $Al_2O_3$ | 35 wt % |
| $SiO_2$ | <3 wt % |
| MgO | OPTIONAL; |
| CaO | 50–60 wt % |
| $Al_2O_3$ | 35–45 wt % |

|   |   |
|---|---|
| MgO | OPTIONAL |
| SiO₂ | <3 wt %, |
| particularly | |
| CaO | 57% |
| Al₂O₃ | 39% |
| SiO₂ | <3% |
| MgO | OPTIONAL. |

Specific particularly preferred compositions of the invention, utilizing dolomitic lime, are the following:

|   |   |
|---|---|
| CaO | 45–55 wt % |
| Al₂O₃ | 20–30 wt % |
| MgO | 15–25 wt % |
| SiO₂ | <3 wt % |
| particularly | |
| CaO | 51 wt % |
| Al₂O₃ | 26 wt % |
| MgO | 22 wt % |
| SiO₂ | <3 wt % |
| CaO | 50–60 wt % |
| Al₂O₃ | 30–40 wt % |
| MgO | 10–20 wt % |
| SiO₂ | <3 wt %, |
| particularly | |
| CaO | 52 wt % |
| Al₂O₃ | 35 wt % |
| MgO | 15 wt % |
| SiO₂ | <3 wt %, |
| CaO | 45–55 wt % |
| Al₂O₃ | 35–45 wt % |
| MgO | 5–15 wt % |
| SiO₂ | <3 wt %, |
| particularly | |
| CaO | 48 wt % |
| Al₂O₃ | 39 wt % |
| MgO | 11 wt % |
| SiO₂ | <3 wt %, |

An optimal composition of the invention is as follows:

|   |   |
|---|---|
| CaO | 40–60 wt % |
| Al₂O₃ | 35–55 wt % |
| SiO₂ | <3 wt % |
| MgO | <1 wt % |
| Fe₂O₃ | <1 wt % |
| N₂ | <.2 wt % |
| CaF₂ | OPTIONAL |
| C | trace |
| P | trace |
| S | trace, |
| particularly | |
| CaO | 50–60 wt % |
| Al₂O₃ | 35–45 wt % |
| SiO₂ | <3 wt % |
| MgO | <1 wt % |
| Fe₂O₃ | <1 wt % |
| N₂ | <.2 wt % |
| C | trace |
| P | trace |
| S | trace. |

The preferred compositions of the invention may be used in combination with spar, CaF₂, substituting in part for that amount of spar previously called for to effect flux solubilization, desulfurization and/or removal of inclusions. Use of the preferred compositions of the invention together with spar ameliorates the deleterious effects of spar utilization, while affording the advantageous properties of the compositions of the invention.

The preferred processes of the invention comprise the addition of the preferred compositions during the process of steelmaking utilizing electric furnace, basic oxygen furnace, AOD furnace or open hearth furnace means. The preferred composition, in the necessary quantity, may be added directly to the furnace utilized with the initial charge, or at any time prior to the tapping of the heat. The preferred compositions become incorporated in the slag layer and provide solubility for lime and/or other fluxing materials, while effecting desulfurization and the removal of undesired inclusions. The slag layer may be removed, or left in the furnace, utilizing techniques known to those skilled in the steelmaking arts, which results in the entrapment of the deleterious materials in the slag.

Alternatively, the preferred compositions of the invention may be added to the steel layer after tapping of the heat and its transfer to the ladle. The composition is added to the ladle so as to form a blanket (or cover) layer over the molten steel. The composition draws the undesired sulfur and/or inclusions out of the steel and into the blanket layer, while simultaneously serving to insulate the molten steel and preserve desired heat and maintain the necessary temperature profile in the metal. The overlayer formed by the composition, together with any other slag or extraneous material, may be removed, or left in the ladle, utilizing techniques known to those skilled in the steelmaking arts, which results in the entrapment of the deleterious materials in the blanket or overlayer.

The preferred compositions of the invention may also be added to the tundish. As with addition to the ladle, tundish addition results in the formation of a blanket (or cover) layer over the molten steel. The composition draws the undesired inclusions out of the steel and into the blanket layer, while simultaneously preventing reoxidation and recarburization and serving to insulate the molten steel, preserving desired heat and maintaining the necessary temperature profile in the metal. The presence of the preferred composition in the tundish also enhances desulfurization of the molten steel. The overlayer formed by the composition, together with any other slag or extraneous material, may be removed, or left in the tundish, utilizing techniques known to those skilled in the steelmaking arts. Again, use of the preferred compositions results in the entrapment of the deleterious materials in the blanket or overlayer.

The preferred compositions of the invention may be used in combination with other known steelmaking additives and additive compositions, including fluxing materials, desulfurizing compounds, degassing compounds, and other such materials.

While particular embodiments of the invention, and the best mode contemplated by the inventor for carrying out the invention, have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

I claim:

1. A steelmaking additive composition consisting essentially of from about 25 to 50 wt% lime and about 75 to 50 wt% of a compound selected from the group consisting of bauxite and mixtures of calcium aluminate and bauxite.

2. The composition of claim 1 consisting essentially of about 50 wt% lime and about 50 wt% of composition selected from the group consisting of bauxite and mixtures of calcium aluminate and bauxite.

3. The composition of claims 1 and 2 wherein said lime is dolomitic lime.

4. The composition of claim 3 wherein said lime is calcined.

5. The composition of claims 1, 2, 3 or 4 consisting essentially of about 50 wt % lime, 35 wt % calcium aluminate and 15 wt % bauxite.

6. A steelmaking additive composition consisting essentially of from about 40 to 70 wt% CaO, 20 to 50 wt% $Al_2O_3$ from bauxite or mixtures of calcium aluminate and bauxite and 0 to 30 wt% MgO.

7. The composition of claim 6 consisting essentially of about 65 to 70 wt% CaO, 25 to 30 wt% $Al_2O_3$ from bauxite or mixtures of calcium aluminate and bauxite, and 0 to 30 wt% MgO.

8. In the process of steelmaking utilizing electric furnace, basic oxygen furnace, AOD furnace or open hearth furnace means, the improvement consisting of the addition of a steelmaking additive composition consisting essentially of from about 25 to 50 wt% lime and about 75 to 50 wt% of a compound selected from the group consisting of bauxite and mixtures of calcium aluminate and bauxite.

9. The process of claim 8 wherein said composition consists essentially of about 50 wt% lime and about 50 wt% of a compound selected from the group consisting of bauxite and mixtures of calcium aluminate and bauxite.

10. The process of claims 8 or 9 wherein said lime in said composition is dolomitic lime.

11. The process of claim 10 wherein said lime in said composition is calcined.

12. The process of claims 8, 9, 10 or 11 wherein said composition consists essentially of about 50 wt% lime, 35 wt% calcium aluminate and 15 wt% bauxite.

13. In the process of steelmaking utilizing electric furnace, basic oxygen furnace, AOD furnace or open hearth furnace means, the improvement consisting of the addition to the molten steel of a steelmaking additive composition consisting essentially of from about 40 to 70 wt% CaO, 20 to 50 wt% $Al_2O_3$ from bauxite or mixtures of calcium aluminate and bauxite and 0 to 30 wt% MgO.

14. The process of claim 13 wherein said composition consists essentially of about 65 to 70 wt% CaO, 25 to 30 wt% $Al_2O_3$ from abuxite or mixtures of calcium aluminate and bauxite, and 0 to 30 wt% MgO.

* * * * *